G. E. GOODWIN.
ANTITHEFT DEVICE FOR AUTOMOBILES.
APPLICATION FILED APR. 29, 1921.

1,409,845.

Patented Mar. 14, 1922.

G. E. Goodwin INVENTOR

BY Victor J. Evans

ATTORNEY

WITNESSES.

G. E. GOODWIN.
ANTITHEFT DEVICE FOR AUTOMOBILES.
APPLICATION FILED APR. 29, 1921.
1,409,845.
Patented Mar. 14, 1922.
3 SHEETS—SHEET 2.
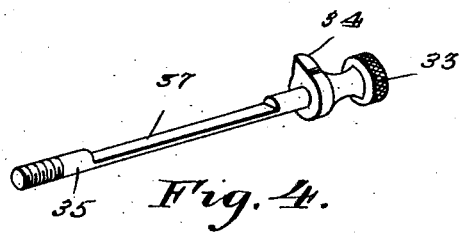
Fig. 4.
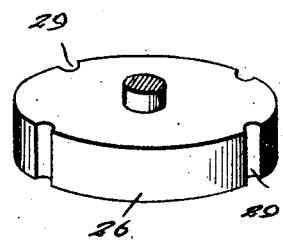
Fig. 5.
Fig. 6.
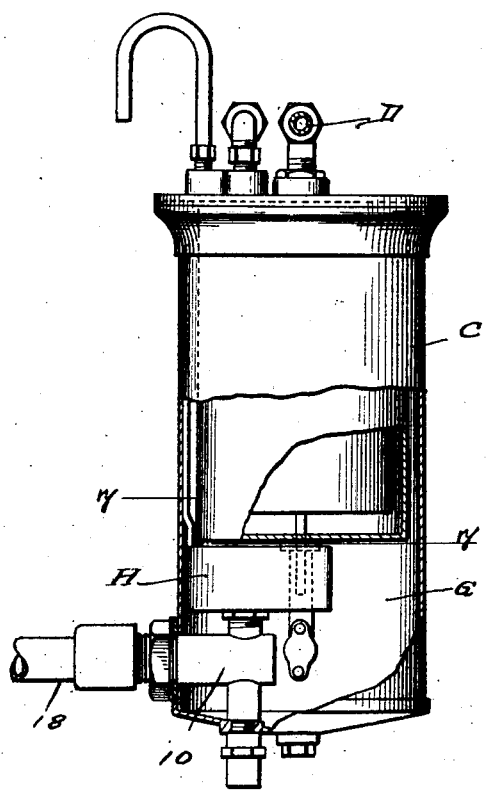
Fig. 7.
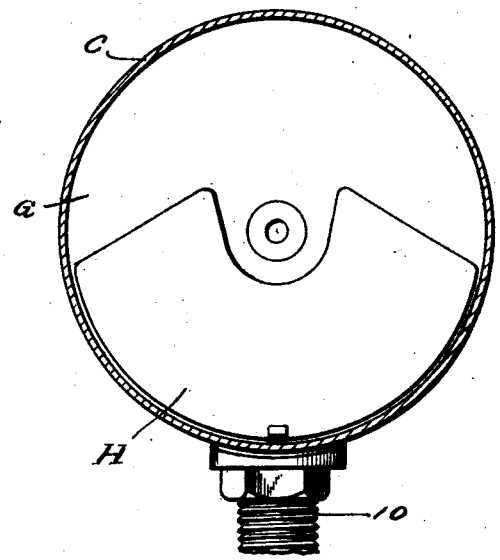
G. E. Goodwin INVENTOR
BY Victor J. Evans ATTORNEY G. E. GOODWIN.
ANTITHEFT DEVICE FOR AUTOMOBILES.
APPLICATION FILED APR. 29, 1921.
1,409,845. Patented Mar. 14, 1922.
3 SHEETS—SHEET 3.
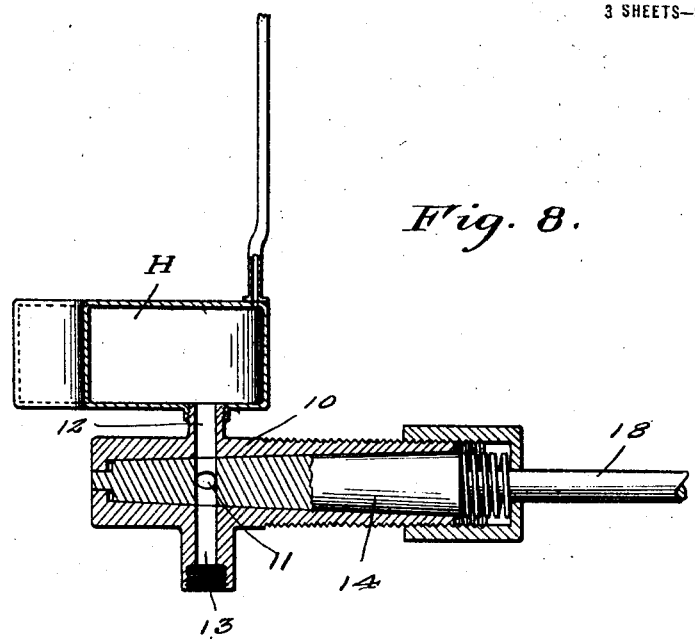
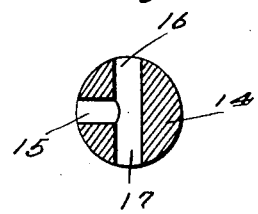
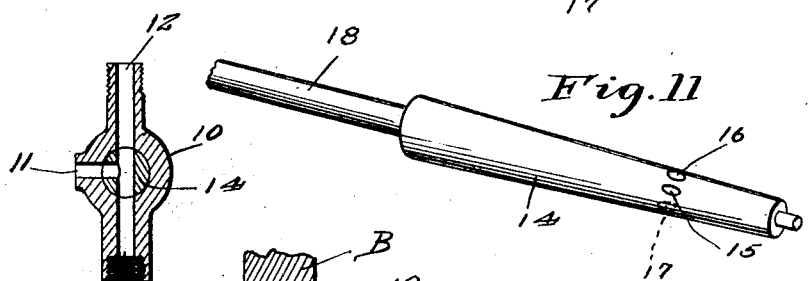
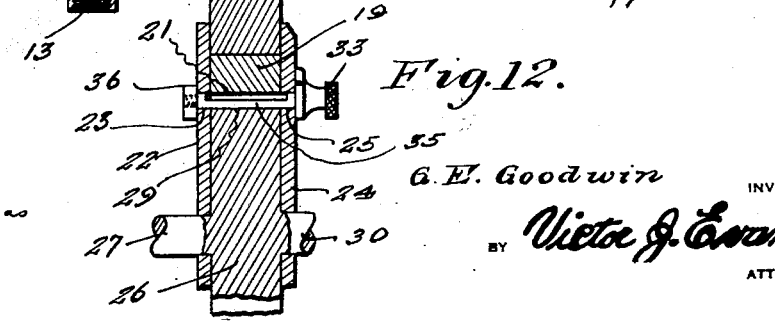
G. E. Goodwin INVENTOR
BY Victor J. Evans ATTORNEY
WITNESSES

UNITED STATES PATENT OFFICE.

GEORGE E. GOODWIN, OF CONCORD, NEW HAMPSHIRE.

ANTITHEFT DEVICE FOR AUTOMOBILES.

1,409,845.  Specification of Letters Patent.  Patented Mar. 14, 1922.

Application filed April 29, 1921. Serial No. 465,481.

*To all whom it may concern:*

Be it known that I, GEORGE E. GOODWIN, a citizen of the United States, residing at Concord, in the county of Merrimack and State of New Hampshire, have invented new and useful Improvements in Antitheft Devices for Automobiles, of which the following is a specification.

This invention relates to anti-theft devices for automobiles and has for its object the provision of a rockable valve device associated with the vacuum tank of an automobile gasoline system whereby the tank may be locked so that no gasoline at all will pass therethrough, so that only the amount of gasoline in the auxiliary tank may flow to the carburetor, that the gasoline from the main tank and the auxiliary tank may both flow to the carburetor or that gasoline from the main tank alone may be fed while still retaining whatever amount remains in the auxiliary tank.

An important object is the provision of a device of this character which includes a combination lock mechanism mounted on the dash of the automobile whereby the position of the valve may be controlled and whereby the valve may be positively locked so that it could not be manipulated by a person unfamiliar with the combination.

An important feature of the invention is the fact that the valve can be so locked as to permit the gasoline within the small auxiliary tank to be used, the advantage of this being that in case of a fire an automobile equipped with my device might be moved out of the fire zone, the device thus complying with the fire insurance company's regulations regarding automobile locking devices.

Another object is the provision of a device of this character in which the combination lock device may be utilized for locking the valve in one of its positions.

An additional object is the provision of a device of this character which will be comparatively simple and inexpensive in manufacture and insulation, highly efficient in use, positive in action, durable in service and a general improvement in the art.

With the above and other objects and advantages in view, the invention consists in the details of construction to be hereinafter more fully described, and claimed, and illustrated in the accompanying drawings, in which:—

Figure 1 is a longitudinal sectional view through the front portion of an automobile showing my device in applied position, my device being shown in elevation, Figure 2 is an enlarged front elevation of the combination lock device mounted upon the dash, Figure 3 is a detail view of this combination locking device showing the cover plate removed, the section being taken in a plane parallel with the dash, Figure 4 is a detail perspective view of one of the locking members removed, Figure 5 is a detailed perspective view of the notched rotary disk member.

Figure 6 is a side elevation of the vacuum tank with a portion thereof broken away and in section to disclose my mechanism therein.

Figure 7 is a cross sectional view on the line 7—7 of Figure 6,

Figure 1:
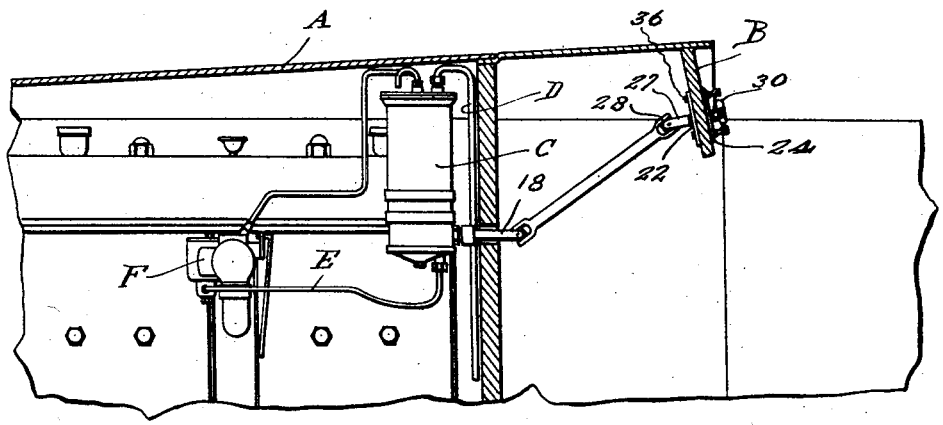
Figure 2:
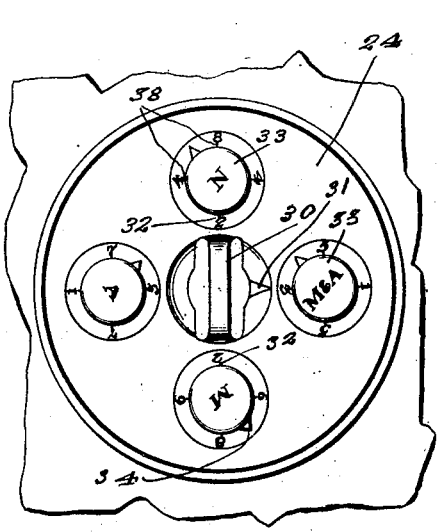
Figure 3:
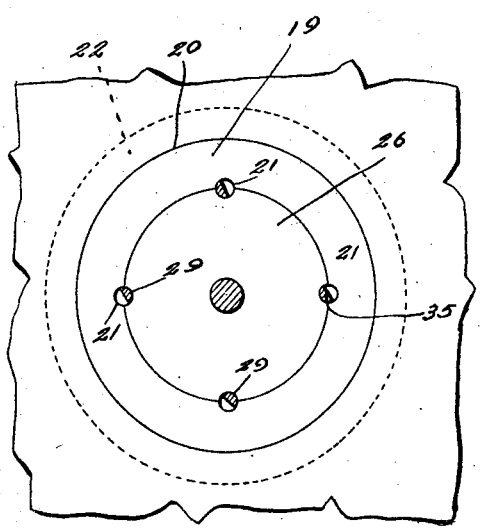

Figure 8 is a detail sectional view showing the valve member associated with the vacuum tank, Figure 9 is a vertical cross sectional view through this valve member, Figure 10 is a detail cross sectional view through the valve plug or rotary member, Figure 11 is a detail perspective view of the valve plug removed, and Figure 12 is a detail cross sectional view through the lock device mounted on the dash.

Referring more particularly to the drawings the letter A designates the front portion of an automobile, B designates the dash thereof, C the ordinary vacuum tank, D the fuel feed pipe leading into the vacuum tank and E designates the outlet pipe leading from the vacuum tank to the carbureter F. The tank C is formed or provided with a main compartment G communicating with an auxiliary compartment H as is the ordinary construction.

In carrying out my invention I provide a valve device located within the lower portion of the vacuum tank and including a casing or barrel 10 having a port 11 communicating with the main compartment G, having a port 12 communicating with the auxiliary compartment H and also having a port 13 leading into the outlet pipe E which leads to the carbureter. Rotatably mounted within this barrel or casing 10 is a float valve 14 of the three-way type formed with passages 15, 16 and 17 which are angularly arranged as shown. This plug 14 has an elongated stem 18 formed thereon which extends considerably outwardly beyond the tank C as shown.

The permutation locking portion of my device for controlling the location and for effecting locking of the plug valve 14 comprises a ring-like metallic member 19 secured within a hole 20 formed in the dash B of the vehicle. At points ninety degrees apart the inner periphery of the ring 19 is formed with semi-circular recesses 21. Disposed against the rear side of the dash and covering the hole 20 and ring 19 is a circular plate 22 provided at points ninety degrees with a plurality of holes 23 for a purpose to be described. Disposed against the front side of the dash is a similar plate or disk 24 which covers the ring 19 and hole 20 and which is formed with holes 25 alining with the holes 23. Journaled within the ring member 19 is a disk 26 from one side of which extends a stem 27 journaled through the plate 22 and connected with the stem 18 by means of a suitable universal joint 28. The periphery of the disk 26 is formed with a plurality of semi-circular recesses 29 spaced ninety degrees apart and adapted to cooperate with the recesses 21. Extending from the other side of the disk 26 is a handle member 30 journaled through the plate 24 and formed with a lateral extension 31 constituting a pointer movable over a plurality of graduations 32 on the plate 24.

From the above description it will be seen that when the operator grasps the handle 30 and rotates it to bring the extension or pointer 31 into registration with a desired one of the graduations 32, the stem 18 will be correspondingly turned and this will result in turning the valve plug 14 to bring the passages 15, 16 or 17 therein in position to register selectively with the ports 11, 12 and 13. It will be seen that in one position of the plug valve 14, gasoline flowing from the vacuum tank to the outlet pipe or tube E will be absolutely cut off. When the parts are in this position it will be seen that if an attempt is made to operate an automobile equipped with my device, the motor may be driven only as long as the gasoline in the carbureter lasts. This might not be enough to move the automobile to safety in case of a fire or the like, and in order to permit such sufficient movement, the plug 14 may be turned so that the passages therein will establish communication between the auxiliary compartment H and the outlet port 13 whereupon the engine may be operated as long as there is any gasoline remaining in the auxiliary compartment. At another position of the handle 30 and consequently the plug valve 14, communication will be established between the main compartment G and the outlet port 13 leading to the outlet pipe E so that gasoline may be used from the main tank without interfering with the supply remaining in the auxiliary tank. This is of advantage as it is preferable to retain a certain amount of gasoline in the auxiliary tank for various reasons. At the remaining position of the handle 30 and consequently the plug valve 14 the passages in the plug will establish communication with both the main and auxiliary compartments G and H respectively and with the outlet port 13 leading to the outlet pipe E. In this latter mentioned case it will be seen that the entire gasoline supply may be conducted to the carbureter.

The combination locking means for locking the disk 26 and consequently the plug valve 14 against rotation, comprises a plurality of knobs 33 carrying indicators 34 and formed on threaded shanks 35 which are journaled through the mating recesses 21 and 29 and which are secured in place by passing through the registering holes 23 and 25. These shanks extend beyond the plate 24 and carry suitable nuts 35 which prevent longitudinal movement of the shanks. Each shank is cut away at one side for half of its thickness and indicated at 37 so that at certain positions the shanks and knobs may be rotated. The indicators 34 carried by the knobs are movable over graduations 38 arranged in circular series about each knob and numbered as indicated. The operation of this locking structure is as follows: When all the knobs 33 are in such position that the cut away portions 37 of their shanks are disposed within the recesses 29 in the disk 26, the disk 26 and consequently the plug valve 14 may be turned as above described for moving the plug valve 14 into any desired position, this position being readily ascertainable by the cooperation of the pointer 31 with the graduations 32. After the disk 26 has been moved to bring the plug valve 14 into its desired relation, in order to lock the valve it is merely necessary that the operator rotate any one or all of the knobs 33 so that the shank thereof will be disposed in the mating recesses 21 and 29 whereupon rotation of the disk will be prevented. It is of course understood that the operator must know upon which of the graduations 38 the pointers 34 of the knobs 33 must be placed in order to bring the shanks 35 into such a position that the cut away portions thereof will be within the recesses 29. As it is well known that the provision of four knobs cooperating with four indicating positions for each knob will produce 256 combinations and this will be an effective safeguard against operation of the device by an unauthorized person as entirely too much time would be consumed in the manipulation of the knob to try all the combinations. The device will consequently be a great deterrent to would-be thieves and will be a great protection for an automobile.

From the foregoing description and a study of the drawings it will be apparent that I have thus provided a simply constructed and consequently inexpensive and easily installed control valve and locking means therefor whereby the flow of gasoline through or from a vacuum tank of an automobile may be controlled in a very easy and efficient manner so as to frustrate any attempt at theft while yet permitting a sufficient flow of gasoline to enable the automobile to be moved out of the danger zone in case of a fire.

While I have shown and described the preferred embodiment of my invention, it is of course to be readily understood that I reserve the right to make such changes in the form, construction and arrangement of parts as will not depart from the spirit of the invention or the scope of the subjoined claims.

Having thus described my invention I claim:

1. A fuel supply locking device for motor vehicles comprising the combination with the vacuum tank including main and auxiliary compartments, of a valve located within the lower portion of the vacuum tank and movable to establish communication between either or both of said compartments and the fuel pipe leading to the carbureter or to cut off such communication, and means for moving and locking said valve in a selected position.

2. A fuel supply locking device for motor vehicles comprising the combination with the vacuum tank including main and auxiliary compartments, of a valve located within the lower portion of the vacuum tank and movable to establish communication between either or both of said compartments and the fuel pipe leading to the carbureter or to cut off such communication, means for moving and locking said valve in a selected position, said locking means consisting of a permutation lock device located upon the dash of the vehicle.

3. A fuel supply locking device for motor vehicles comprising the combination with the vacuum tank including main and auxiliary compartments, of a valve located within the lower portion of the vacuum tank and movable to establish communication between either or both of said compartments and the fuel pipe leading to the carbureter or to cut off such communication, means for moving and locking said valve in a selected position, said locking means comprising a rotary element journaled upon the dash of the vehicle and connected with the stem of said valve, and a plurality of tumblers associated with said rotary element and movable selectively to permit or prevent rotation thereof.

4. A fuel supply locking device for motor vehicles comprising the combination with the vacuum tank including main and auxiliary compartments, of a valve located within the lower portion of the vacuum tank and movable to establish communication between either or both of said compartments and the fuel pipe leading to the carbureter or to cut off such communication, means for moving and locking said valve in a selected position, said means comprising a rotary element journaled upon the dash of the vehicle and connected with the stem of said valve, said rotary element being provided in its periphery with a series of recesses, and a plurality of knobs rotatable independently of said rotary member and having shanks journaled through said recesses and formed with cut-away portions whereby the shanks may be turned into non-obstructing relation to the recesses for permitting rotation of the first named rotary element.

In testimony whereof I affix my signature.

GEORGE E. GOODWIN.